(12) United States Patent
Li et al.

(10) Patent No.: US 9,636,636 B2
(45) Date of Patent: May 2, 2017

(54) COMBINATION UNIT AND COMBINATION METHOD OF MULTIPLE MEMBRANE SHELLS

(75) Inventors: Youqing Li, Heilongjiang (CN); Jingbo An, Shandong Province (CN); Qiyuan Wang, Shandong Province (CN); Yucheng Li, Shandong Province (CN)

(73) Assignee: Harbin ROPV Industry Development Center, Heilongjiang (CN)

( * ) Notice: Subject to any disclaimer, the term of this patent is extended or adjusted under 35 U.S.C. 154(b) by 514 days.

(21) Appl. No.: 13/881,205

(22) PCT Filed: Oct. 26, 2010

(86) PCT No.: PCT/CN2010/078122
§ 371 (c)(1),
(2), (4) Date: Apr. 24, 2013

(87) PCT Pub. No.: WO2012/055092
PCT Pub. Date: May 3, 2012

(65) Prior Publication Data
US 2013/0206695 A1    Aug. 15, 2013

(51) Int. Cl.
*B01D 29/50* (2006.01)
*B01D 65/00* (2006.01)
(Continued)

(52) U.S. Cl.
CPC ........... *B01D 65/003* (2013.01); *B01D 63/06* (2013.01); *C02F 1/44* (2013.01); *B01D 63/12* (2013.01);
(Continued)

(58) Field of Classification Search
CPC .......... B01D 2313/02; B01D 2313/025; B01D 2313/10; B01D 2313/12; B01D 2313/21;
(Continued)

(56) References Cited

U.S. PATENT DOCUMENTS 2,059,390 A * 11/1936 Pagel ............ B65D 67/00
206/443
3,059,941 A * 10/1962 Kaynor ............ F16L 21/05
277/603
(Continued)

*Primary Examiner* — David C Mellon
*Assistant Examiner* — Pranav Patel
(74) *Attorney, Agent, or Firm* — Coats and Bennett PLLC (57) ABSTRACT

The present invention discloses a combination unit and method of multiple membrane shells. The combination unit of multiple membrane shells is formed by bundling multiple membrane shells in parallel, wherein the raw water port and the concentrated water port of each of the membrane shells are respectively connected and sealed with the raw water port and the concentrated water port of the adjacent membrane shells to form the shared raw water port and the shared concentrated water port which are respectively connected with the raw water pipeline and the concentrated water pipeline. Since each of the combination units of multiple membrane shells is provided with the shared raw water port and the shared concentrated water port, it is adequate to finish the assembly of the shared raw water port with the pipeline and the assembly of the shared concentrated water port with the pipeline in the engineering installation. The combination unit of multiple membrane shells can be placed horizontally or vertically. By adopting the technology of the combination unit of multiple membrane shells, there does not need a large number of clamps, the number of sealed points is decreased, the engineering cost is reduced, the hidden seepage danger is lowered, the engineering installation workload is lessened, the occupied area of the apparatus is saved, and the maintenance and the service are convenient.

10 Claims, 6 Drawing Sheets

(51) Int. Cl.
*B01D 63/06* (2006.01)
*C02F 1/44* (2006.01)
*B01D 63/10* (2006.01)
*B01D 63/12* (2006.01)

(52) U.S. Cl.
CPC ...... *B01D 2313/13* (2013.01); *B01D 2313/54* (2013.01); *B01D 2317/04* (2013.01); *C02F 2201/004* (2013.01); *C02F 2201/007* (2013.01)

(58) Field of Classification Search
CPC .......... B01D 2313/06; B01D 2313/105; B01D 2313/125; B01D 2313/20; B01D 2313/54; B01D 2313/13; B01D 2201/0469; B01D 2319/02; B01D 2319/04; B01D 63/10; B01D 63/12
USPC ..... 210/232, 252, 253, 255, 321.74, 321.78, 210/321.79, 321.8, 321.83, 321.87, 210/321.88, 321.89, 323.2, 340; 248/49–74
See application file for complete search history.

(56) References Cited

U.S. PATENT DOCUMENTS

| | | | | |
|---|---|---|---|---|
| 3,261,735 A | * | 7/1966 | Brown | F16L 21/005 |
| | | | | 156/158 |
| 5,405,528 A | * | 4/1995 | Selbie | B01D 35/303 |
| | | | | 210/232 |
| 6,007,723 A | * | 12/1999 | Ikada et al. | 210/650 |
| 2007/0131614 A1 | * | 6/2007 | Knappe | B01D 61/14 |
| | | | | 210/636 |
| 2007/0199878 A1 | * | 8/2007 | Eisberg | B01D 63/106 |
| | | | | 210/321.8 |

* cited by examiner

COMBINATION UNIT AND COMBINATION METHOD OF MULTIPLE MEMBRANE SHELLS

This application is a U.S. National Stage Application of PCT Application No. PCT/CN2010/078122, with an international filing date of 26 Oct. 2010. The subject matter of this application is incorporated herein.

FIELD OF THE INVENTION

The present invention relates to the combination technology of membrane shell, especially to a combination unit and method of multiple membrane shells, which are applied to a membrane separation apparatus.

BACKGROUND OF THE INVENTION

Recently, each of the membrane shells used in the membrane separation apparatus is independent, and is at least provided with one raw water port and one concentrated water port. During the engineering installation, when the raw water port and one concentrated water port of each of the membrane shells are respectively assembled with the raw water port and one concentrated water port of other membrane shells or a pipeline, each of the joints requires a clamp for connection, thus requiring a large number of clamps, which causes high construction cost. In addition, in the prior art, there are multiple sealed points, the hidden seepage danger is high, the workload for the engineering installation is great, and the occupied area of the apparatus is large. Therefore, there is an urge need to solve the above problems.

SUMMARY OF THE INVENTION

The technical problem to be solved in the present invention is to: provide a combination unit and a method of multiple membrane shells in order to improve or overcome one or more shortcomings in the prior art.

The technical solution of the present invention is that: a combination unit of multiple membrane shells formed by bundling multiple membrane shells in parallel, in which a raw water port and a concentrated water port of each of the membrane shells are respectively intercommunicated with those of an adjacent membrane shell, the combination unit of multiple membrane shells is formed with at least one shared raw water port and at least one shared concentrated water port which are respectively capable of being connected with a raw water pipeline and a concentrated water pipeline.

The present invention further provides a combination method of multiple membrane shells, in which multiple membrane shells is bundled in parallel to form the combination unit of multiple membrane shells, in which a raw water port and a concentrated water port of each of the membrane shells are respectively intercommunicated with those of an adjacent membrane shell, after combination, forming at least one shared raw water port and at least one shared concentrated water port which are respectively capable of being connected with pipelines.

The present invention has the characteristics and advantages that: in the combination unit of multiple membrane shells and the method for combination multiple membrane shells of the present invention, the technical method of bundling multiple membrane shells in parallel is adopted, the raw water port and the concentrated water port of each of the membrane shells are respectively connected and sealed with the raw water port and the concentrated water port of one or more adjacent membrane shells by an adapter to form the shared raw water port and the shared concentrated water port. Each of the combination units of multiple membrane shells can be provided with only one shared raw water port and one shared concentrated water port so as to be assembled with the pipeline conveniently. Obviously, each of the combination units of multiple membrane shells can also be provided with multiple shared raw water ports and multiple shared concentrated water ports if engineering needs. Since each of the combination units of multiple membrane shells is provided with the shared raw water port and the shared concentrated water port, it is adequate to finish the assembly of the shared raw water port with the pipeline and the assembly of the shared concentrated water port with the pipeline during the engineering installation. According to the engineering requirement, the combination unit of multiple membrane shells can be placed horizontally or vertically. By adopting the technology of the combination unit of multiple membrane shells, there does not need a large number of clamps, the engineering cost is reduced, the number of sealed points is decreased, the hidden seepage danger is lowered, the engineering installation workload is lessened, and the occupied area of the apparatus is saved.

REFERENCE NUMBER

1: membrane shell 2: shared raw water port 3: shared concentrated water port
4: binding tape 5: pressure adjuster 51: preloaded bolt
52: preloaded cushion block 53: piston 54: piston sealing ring
55: cushion block 5': adapter snapping ring 6: adapter
7: sealing rubber ring 12: raw water port 13: concentrated water port
15: opening

DETAILED DESCRIPTION OF THE EMBODIMENTS

The present invention provides a combination unit and a method of multiple membrane shells. The combination unit of multiple membrane shells is formed by bundling multiple membrane shells in parallel, in which the raw water port and the concentrated water port of each of the membrane shells are respectively connected and sealed with those of the adjacent membrane shells so as to make the raw water port of each of the membrane shells interconnected and the concentrated water port of each of the membrane shells also interconnected, the shared raw water port and the shared concentrated water port of the combination unit of multiple membrane shells are respectively connected with the pipeline, a raw water interconnection passage is formed between the raw water ports of multiple membrane shells, and a concentrated water interconnection passage is formed between the concentrated water ports of multiple membrane shells.

During operation, each of the combination units of multiple membrane shells makes water flow in though the shared raw water port, and the raw water distributes into each of the membrane shells after entering each of the combination units of multiple membrane shells since the raw water ports of multiple membrane shells are intercommunicated; under the operation pressure, the raw water permeates through a membrane element and is separated into clear water and concentrated water; the concentrated water mixes together and is discharged by the shared concentrated water port since the concentrated water ports of multiple membrane shells are interconnected. Since each of the combination units of multiple membrane shells is provided with a relatively small number of raw water ports and concentrated water ports (e.g. one raw water port and one concentrated water port can be provided), in engineering installation, it is adequate to finish assembling of a relatively small number of raw water ports and the concentrated water ports with the pipeline, thereby saving a large number of clamps, reducing the engineering cost, decreasing the number of sealed points, lowering the hidden seepage danger, lessening the engineering installation workload, and saving the occupied area of the apparatus.

Preferably, the raw water port and the concentrated water port of each of the membrane shell units are connected and sealed by the adapter which is only arranged at a neighbor opening position outside the two adjacent membrane shell units and does not extend into an inner chamber of the membrane shell, thereby not influencing the inner structure of the membrane shell and the subsequent assembling of the membrane shell unit; further, a structure of external connection can be used for the adapter, the two ends of which are aligned with an outer wall of the membrane shell opening, and plane seal may be adopted between the adapter and the membrane shell; or, a structure of internal connection can also be used for the adapter, the two ends of which are inserted into the membrane shell opening, and axial seal may be adopted between the adapter and the membrane shell.

Preferably, after multiple membrane shells is bundled in parallel, it is also possible to utilize a binding firmware to bind the membrane shells together; moreover, a rigid or flexible binding tape can be selected according to needs, and the binding firmware is preferably arranged corresponding to the raw water interconnection passage and the concentrated water interconnection passage respectively; further, a pressure adjuster may be arranged corresponding to the binding tape, for adjusting the change in pressure during operation.

Preferably, the interconnection raw water ports and the concentrated water ports of multiple membrane shells of the present invention are respectively located in two planes vertical to the axial direction, and the binding firmware is preferably at least arranged at a position corresponding to the two planes, so as to achieve better connection and fixation effects.

In the present invention, multiple membrane shells may be combined by utilizing multiple manners of binding in parallel, that is, an end surface of the combination unit may present multiple shapes, for example, a straight line, a triangle, a polygon and other distribution way.

In order to accurately understand the present invention, the specific embodiments of the combination unit and method of multiple membrane shells of the present invention are further explained in detail in conjunction with the drawings and the specific examples.

The First Embodiment

Figure 1:
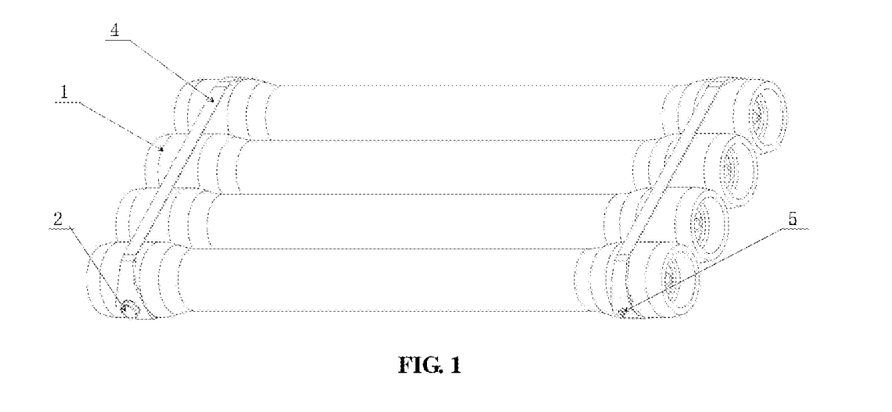
FIG. 1 is a perspective structure schematic diagram of the first embodiment of the present invention.
Figure 2:
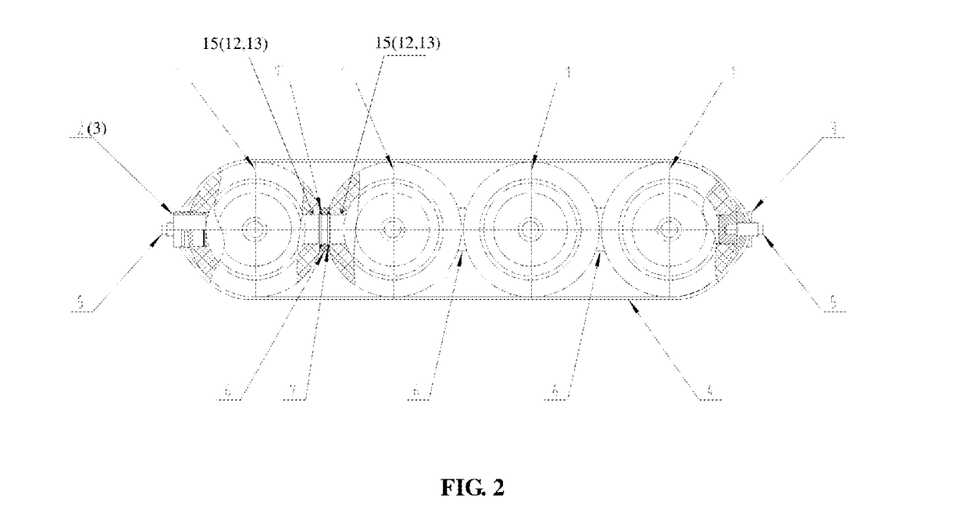
FIG. 2 is a front view of the first embodiment of the present invention.
Figure 3:
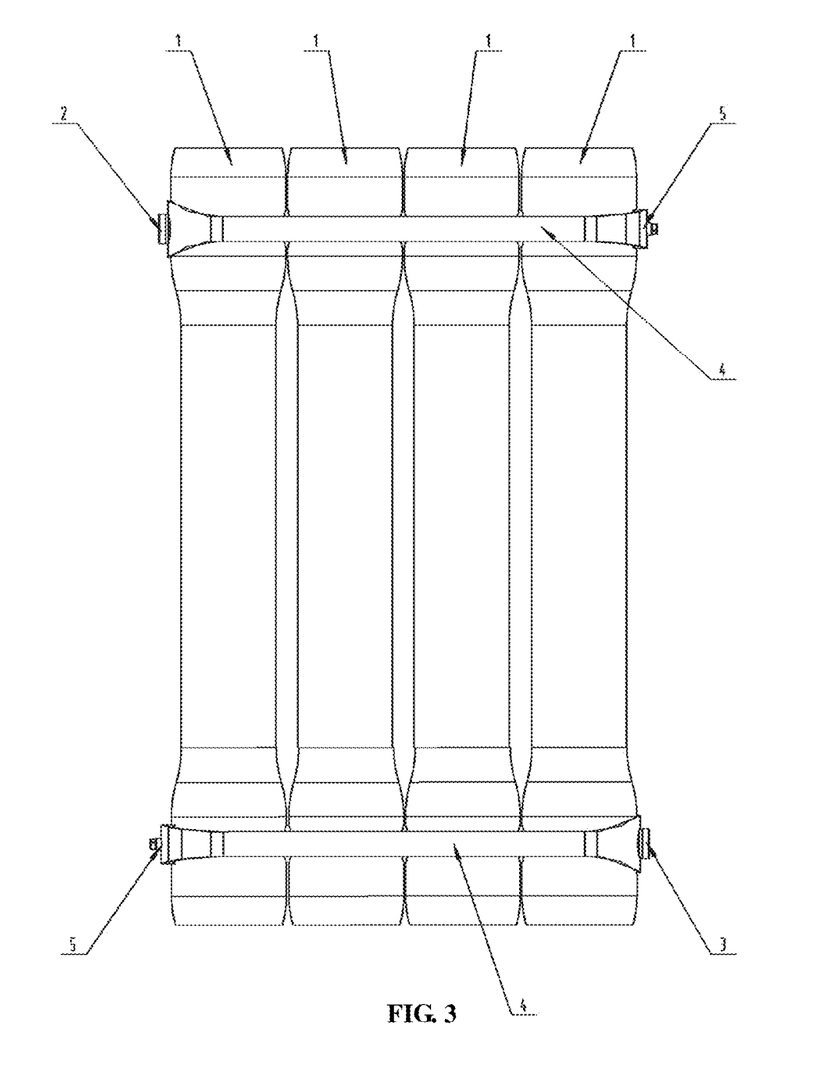
FIG. 3 is a top view of the first embodiment of the present invention.

As shown in FIGS. 1, 2, 3, which are respectively the perspective diagram, the front view and the top view of the first embodiment of the present invention, in the present embodiment, the end surface of the combination unit of multiple membrane shells presents a distribution of straight line, in which the combination unit of multiple membrane shells is formed by bundling multiple membrane shells 1 in parallel, in which the raw water port 12 and the concentrated water port 13 of each of the membrane shells 1 are respectively connected and sealed with the raw water port 12 and the concentrated water port 13 of the adjacent membrane shell by the adapter 6 so as to make the raw water port 12 of each of the membrane shells interconnected and the concentrated water port of each of the membrane shells also interconnected, such that the combination unit of multiple membrane shells has the shared raw water port 2 and the shared concentrated water port 3 which can be connected with the pipelines (not shown in the drawing) respectively, that is, the shared raw water port 2 is connected with the raw water pipeline and the shared concentrated water port 3 is connected with the concentrated water pipeline.

In the present embodiment, the raw water port and the concentrated water port of each of the membrane shells are respectively connected with those of the adjacent membrane shell through the adapter 6 which has external connection structure, with the two ends aligned with the outer wall at the opening of the membrane shell 1, thus not influencing the inner structure of the membrane shell; a sealing rubber ring 7 is utilized between the adapter 6 and the membrane shell 1 for plane seal. Specifically, at least one opening 15 (the raw water port 12 or the concentrated water port 13) is arranged on a side wall of the membrane shell 1, and the openings 15 of the two adjacent membrane shells are arranged facing each other, the adapter 6 and the adapter sealing ring 7 are pressed on an annular plane around the membrane shell opening 15, which ensures the sealing between each adapter 6 and the corresponding membrane shell.

In the present embodiment, the combination unit of multiple membrane shells applies the binding tape 4 for bounding to be one. As shown in FIG. 2, in the present embodiment, except for the right-most membrane shell which can be provided with only one raw water port and the left-most membrane shell which can be provided with only one concentrated water port, one end of each of the other membrane shells is provided with two raw water ports facing each other, and the other end is provided with two concentrated water ports facing each other at the corresponding position. After each of the membrane shells is bundled in parallel and is interconnected by using the adapter 6, the raw water port 12 of each of the membrane shells are straightly interconnected, and the concentrated water port 13 of each of the membrane shells are also straightly interconnected. Therefore, in the present embodiment, the binding tape 4 is provided at the position corresponding to the raw water port and the concentrated water port of each of the membrane shells, so as to strengthen the connection and fixation effects. In the present embodiment, a flexible binding tape is adopted, and the binding tapes 4 are provided at the two ends of the combination unit respectively corresponding to an engaging section among the membrane shells, in which one binding tape 4 is arranged corresponding to the shared raw water port 2, and the other binding tape 4 is arranged corresponding to the shared concentrated water port 3.

Figure 9:
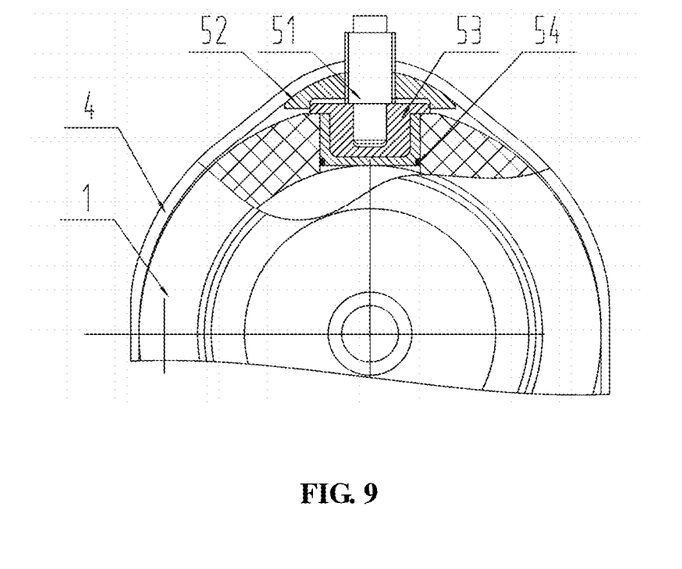
FIG. 9 is a structure schematic diagram of an automatic pressure adjusting mechanism adopted in one embodiment of the present invention.

Each of the binding tapes 4 may be further provided with a pressure adjuster 5, the structure of which is shown in FIG. 9. The pressure adjuster 5 includes a preloaded bolt 51, a preloaded cushion block 52, a piston 53 and a piston sealing ring 54. In installation, the preloaded bolt 51 is screwed in, the position of the preloaded cushion block 52 is adjusted, and the gap between the binding tape 4 and the component is compensated so as to preload the binding tape 4. In the present embodiment, the pressure adjuster 5 is located at the other side opposite to the shared raw water port 2 or the shared concentrated water port 3, in order to automatically adjust the tension of the binding tape by using the pressure inside the membrane shell.

In setting, the binding tape 4 can be made of a rigid or flexible material, the pressure adjuster 5 and the shared raw water port 2 (or the shared concentrated water port 3) respectively correspond to the two ends of the binding tape 4, and through-holes are provided at a position on a rigid sheetbody corresponding to the nuts for the raw/concentrated water port and the preloaded cushion block. Therefore, the rigid sheetbody extend through an external adapter of the pressure adjuster 5 and the shared raw water port 2 (or the shared concentrated water port 3). A fixing nut for the raw water port and a fixing nut for the concentrated water (not shown in the drawing) may be arranged between the membrane shell 1 and the binding tape 4, so as to be conveniently screwed in the external adapter of the shared raw water port 2 and the shared concentrated water port 3.

It should be explained that the binding firmware of the present invention may be selectively arranged. If it is possible to stably fix each of the membrane shells of the combination unit of multiple membrane shells in other ways, the binding firmware may be omitted. Moreover, the form of the binding tape is not limited thereto, but a corrugated (wave shaped) rigid binding tape may be utilized, in which the radian and the interval of the corrugated binding tape are preferably adapted to each membrane shell of the combination unit of multiple membrane shells. Further, the binding firmware in other forms may be utilized, for example, glass cloth or glass fiber is wound at the appropriate position of the periphery of the combination unit of multiple membrane shells, and then the chemical reaction is performed to bind and fix each of the membrane shells.

In addition, in FIG. 9, the piston of the pressure adjuster 5 includes a stainless steel piston body and a piston bush, in which the piston bush is preferably made of, but not limited to, a corrosion-resistant material (such as engineering plastic), such that the pressure adjuster has a corrosion-resistant property. The piston 53 can be integrally made of other corrosion-resistant materials. In addition, the diameter of the piston 53 can be flexibly set, for example, it can be the same as that of the shared raw water port 2 and the shared concentrated water port 3, or the diameter of the piston hole of the piston 53 can be the same as or similar to the opening 15. Preferably, the diameter of the piston 53 is slightly larger than that of the opening 15 or that of the shared raw and concentrated water ports 2 and 3, so as to ensure that the minimal pressure (tension of the binding tape) is used to press each of the sealed positions.

The combination unit of multiple membrane shells of the present embodiment consists of more than two membrane shells, the binding tape, the adapter, (shared) raw and concentrated water ports, and the pressure adjusting mechanism. In installation, firstly, the membrane shells at the two sides and the membrane shell in the middle are arranged into a row in sequence, the adapter 6, the fixing nuts for the raw and concentrated water ports, the piston 53 and the preloaded cushion block 52 are placed at the position of the end portion of the membrane shell where the opening is formed and a counterbore plane is produced, and then the binding tape 4 is pushed in from the end portion, the preloaded bolt 51 is screwed in, the position of the preloaded cushion block 52 is adjusted, and the gap between the binding tape 4 and the component is compensated, so that the binding tape 4 is preloaded. And then, the shared raw and concentrated water ports 2 and 3 are screwed in, the sealing ring at each portion is mounted, and finally the end portion assembly is mounted. After the other end is processed in the same manner, the assembly of the combination unit of multiple membrane shells is finished.

When the membrane shell operates, successively, the raw water enters a raw water end of each of the membrane shells from the shared raw water port 2 through the adapter 6, collects from the other end (the concentrated water end) through the adapter 6 by the membrane element inside the membrane shell, and is discharged from the shared concentrated water port 3. By the operation of the binding tape 4 and the pressure adjuster 5, the adapter 6 and the adapter sealing ring 7 are pressed on the annular plane around the opening 15 of the membrane shell 1, which ensures the sealing between each adapter 6 and the membrane shell 1. Meanwhile, by designing the diameter of the piston 53 of the pressure adjuster 5, it is possible to ensure that the minimal pressure (tension of the binding tape) is used to press each of the sealed positions. It is possible to realize the automatic adjustment of the pressure between the adjacent membrane shells by using the inner pressure of the membrane shell and the restriction of the binding tape. That is, it is possible to ensure that the tension of the binding tape can be automatically adjusted with the change in the water pressure inside the membrane shell. Meanwhile, the deformation of elongation generated by the pressure of the binding tape is compensated, which ensures the sealing effect at the adapter.

The combination unit of multiple membrane shells of the present embodiment is formed by bundling four membrane shells 1 in parallel, which is proposed for convenient explanation. The number of membrane shells arranged in parallel is not limited thereto. In application, more than two membrane shells are mostly arranged in parallel to form a combination unit of multiple membrane shells with an end surface in a straight line, so as to meet the particular requirements.

Since each of the combination units of multiple membrane shells is connected with the pipeline by the shared raw water port 2 and the shared concentrated water port 3, the piping amount is small in engineering installation and maintenance, the number of the clamps to be used is reduced, the resource is saved and the cost is lowered. In addition, according to the engineering requirement, the combination unit of multiple membrane shells can be placed horizontally and vertically; each of the combination units of multiple membrane shells has a relatively small occupied area and thus the space is more effectively used.

The Second Embodiment

Figure 4:
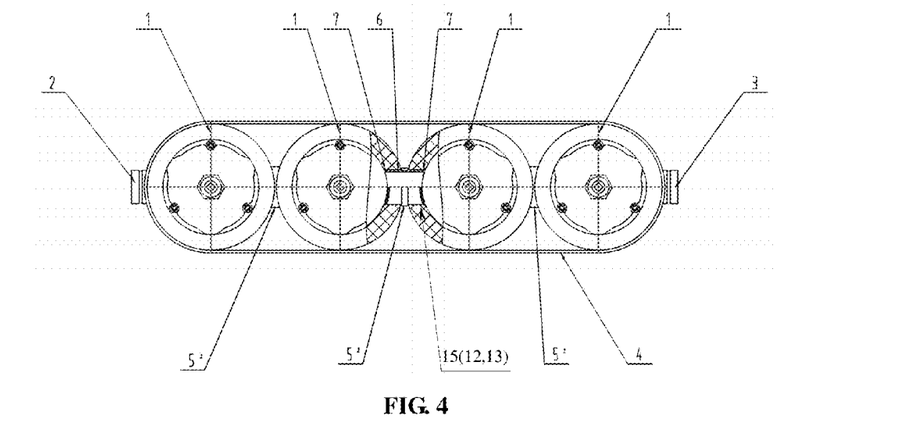
FIG. 4 is a front view of the second embodiment of the present invention.

As shown in FIG. 4, which is the front view of the second embodiment of the present invention, in the present embodiment, the end surface of the combination unit of multiple membrane shells also presents a straight line, like the first embodiment, in which 1 represents the membrane shell; 2 represents the shared raw water port; 3 represents the shared concentrated water port; 4 represents the binding tape; 5' represents the adapter snapping ring; 6 represents the adapter; 7 represents the sealing rubber ring. Multiple membrane shells 1 is bundled in parallel, and then is bound together by using the binding tape 4, the raw water port 12 and the concentrated water port 13 of each of the membrane shells are respectively connected with the raw water port 12 and the concentrated water port 13 of the adjacent membrane shell through the adapter 6, the exposed portion of the adapter 6 is embedded with an adapter snapping ring 5' to prevent the movement of the adapter 6. The adapter 6 is internally connected. When installed, the adapter 6 extends to the inner wall of the membrane shell, and the two ends of the adapter 6 are aligned with the inner wall of the membrane shell 1, thereby not influencing the subsequent installation of the membrane unit; the axial sealing is preferably adopted between the adapter 6 and the membrane shell 1. By this way, each membrane shell after combination is formed with the shared raw water port 2 and the shared concentrated water port 3, and is respectively connected with the pipeline through the shared raw water port 2 and the shared concentrated water port 3.

The combination unit of multiple membrane shells consists of more than two membrane shells, the binding tape, the adapter 6, and (shared) raw and concentrated water ports. In installation, firstly, the membrane shells at the two sides and the membrane shell in the middle are arranged into a row in sequence, fixing nuts for the adapter 6 and the raw/concentrated water port are inserted into the opening 15 close to the end portion of the membrane shell, the binding tape 4 is pushed in from the end portion, and then the shared raw water port 2 and the shared concentrated water port 3 are screwed in, the sealing ring at each portion is mounted, and finally the end portion assembly is mounted. After the other end is processed in the same manner, the assembly of the combination unit of multiple membrane shells is finished.

When the membrane shell operates, successively, the raw water enters the raw water end of each of the membrane shells from the shared raw water port 2 through the adapter 6 and distributes in each of the membrane shells, and permeates a membrane element (not shown in the drawing) mounted inside the membrane shell and is divided into clear water and concentrated water; the concentrated water collects from the other end (the concentrated water end) through the adapter 6 and is discharged from the shared concentrated water port 3. Due to the restriction of the binding tape 4 and the limitation of the snapping ring 5', the adapter 6 and the sealing ring 7 can only limitedly move within a sealed area inside the opening 15 at the end portion of the membrane shell such that the adapter 6 does not come off under pressure and the sealing between the adapter and the membrane shell is ensured.

Since each of the combination units of multiple membrane shells is connected with the pipeline by the shared raw water port 2 and the shared concentrated water port 3, the piping amount is small in engineering installation and maintenance, the number of the clamps to be used is reduced, the resource is saved and the cost is lowered. In addition, each of the combination units of multiple membrane shells has a relatively small occupied area and thus the space is more effectively used.

The Third Embodiment

Figure 5:
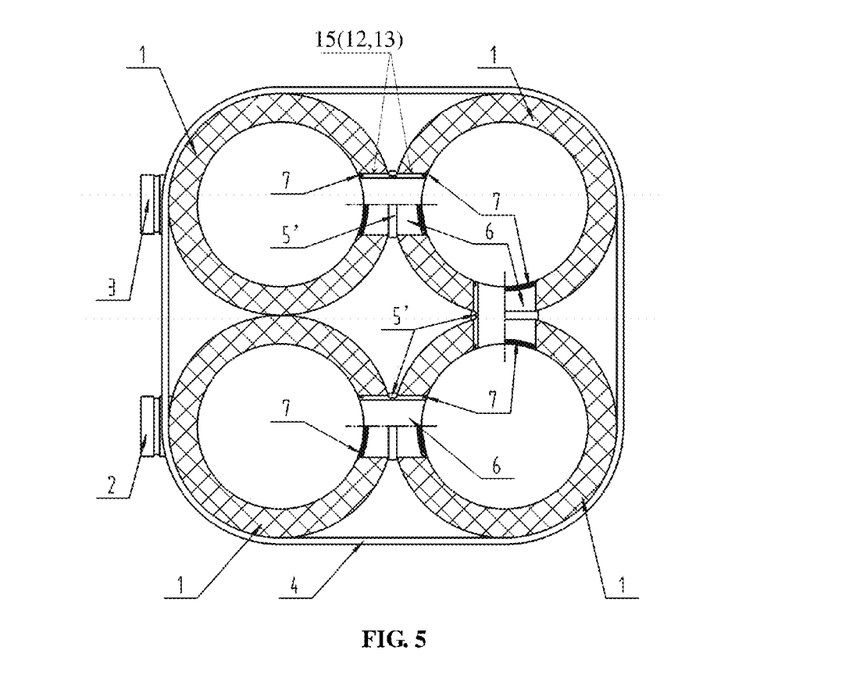
FIG. 5 is a front view of the third embodiment of the present invention.

As shown in FIG. 5, which is the front view of the third embodiment of the present invention, in the present embodiment, the end surface of the combination unit of multiple membrane shells approximately presents a rectangular (or square) distribution, in which 1 represents the membrane shell; 2 represents the shared raw water port; 3 represents the shared concentrated water port; 4 represents the binding tape; 5' represents the adapter snapping ring; 6 represents the adapter; 7 represents the sealing rubber ring. Multiple membrane shells 1 is bundled in parallel, and then is bound together by using the binding tape 4, the raw water port 12 and the concentrated water port 13 of each of the membrane shells are respectively connected with the raw water port 12 and the concentrated water port 13 of the adjacent membrane shell through the adapter 6, the exposed portion of the adapter 6 is embedded with an adapter snapping ring 5' to prevent the movement of the adapter 6. The adapter 6 internally connected. When installed, the adapter 6 extends to the inner wall of the membrane shell, that is, the two ends of the adapter 6 are aligned with the inner wall of the membrane shell 1; the axial sealing is preferably adopted between the adapter 6 and the membrane shell 1. By this way, each membrane shell after combination is formed with the shared raw water port 2 and the shared concentrated water port 3, and is respectively connected with the pipeline through the shared raw water port 2 and the shared concentrated water port 3.

In installation, firstly, the membrane shells 1 are arranged into a rectangular shape in sequence, the adapter 6 is inserted into and the snapping ring 5' and the fixing nuts for the raw/concentrated water port are mounted at the corresponding opening 15 at the end portion of the membrane shell, the binding tape 4 is mounted at the corresponding position, and then the shared raw water port 2 and the shared concentrated water port 3 are screwed in, the sealing ring at each portion is mounted, and finally the end portion assembly is mounted. After the other end is processed in the same manner, the assembly of the combination unit of multiple membrane shells is finished.

When the membrane shell operates, successively, the raw water enters the raw water end of each of the membrane shells from the shared raw water port 2 through the adapter 6, and permeates a membrane element mounted inside the membrane shell 1 and is divided into clear water and concentrated water, in which the concentrated water collects from the other end (the concentrated water end) through the adapter 6 and is discharged from the shared concentrated water port 3. Due to the restriction of the binding tape 4 and the limitation of the snapping ring, the adapter 6 and the sealing ring 7 can only limitedly move within a sealed area inside the opening 15 of the membrane shell 1 close to the end portion such that the adapter 6 does not come off under pressure and the sealing between the adapter and the membrane shell is ensured.

Since each of the combination units of multiple membrane shells is connected with the pipeline by the shared raw water port 2 and the shared concentrated water port 3, the piping amount is small in engineering installation and maintenance, the number of the clamps to be used is reduced, the resource is saved and the cost is lowered. In addition, each of the combination units of multiple membrane shells has a relatively small occupied area and thus the space is more effectively used.

The Fourth Embodiment

Figure 6:
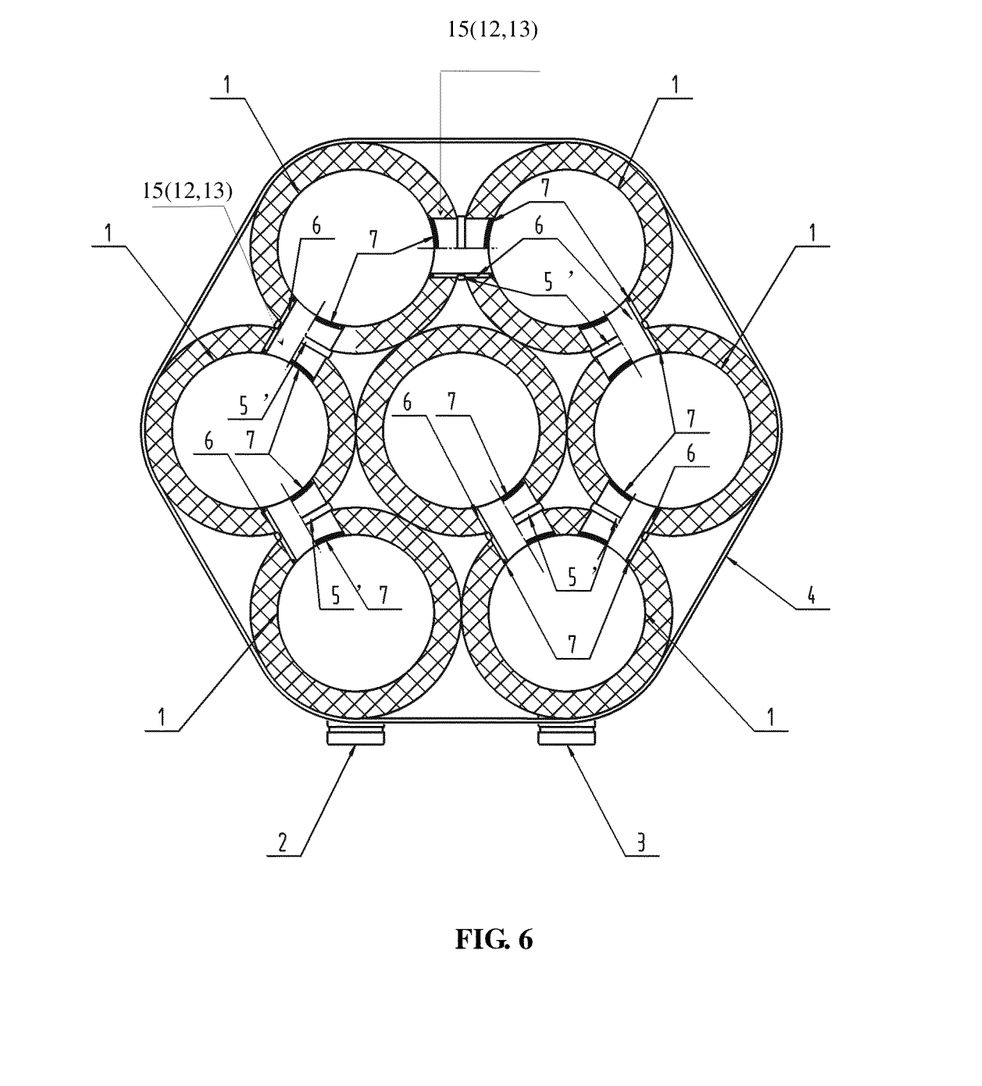
FIG. 6 is a front view of the fourth embodiment of the present invention.

As shown in FIG. 6, which is the front view of the fourth embodiment of the present invention, in the present embodiment, the end surface of the combination unit of multiple membrane shells presents a hexagon (or other polygons) distribution, in which 1 represents the membrane shell; 2 represents the shared raw water port; 3 represents the shared concentrated water port; 4 represents the binding tape; 5' represents the adapter snapping ring; 6 represents the adapter; 7 represents the sealing rubber ring. Multiple membrane shells 1 is bundled in parallel, and then is bound together by using the binding tape 4, the raw water port and the concentrated water port of each of the membrane shells are respectively connected with the raw water port and the concentrated water port of one adjacent membrane shell through the adapter 6, the exposed portion of the adapter 6 is embedded with an adapter snapping ring 5' to prevent the movement of the adapter 6. The adapter 6 internally connected. When installed, the adapter 6 extends to the corresponding inner walls of two membrane shells, that is, the two ends of the adapter 6 are aligned with the inner walls of the two neighbor membrane shells 1; the axial sealing is adopted between the adapter 6 and the membrane shell 1. By this way, each membrane shell after combination is formed with the shared raw water port 2 and the shared concentrated water port 3, and is respectively connected with the pipeline through the shared raw water port 2 and the shared concentrated water port 3.

In installation, firstly, the membrane shells 1 are arranged into a rectangular shape in sequence, the adapter 6 is inserted into and the fixing nuts for the snapping ring 5' and the raw/concentrated water port are mounted at the corresponding opening 15 of the membrane shell close to the end portion, the binding tape 4 is mounted at the corresponding position, and then the shared raw water port 2 and the shared concentrated water port 3 are screwed in, the sealing ring at each portion is mounted, and finally the end portion assembly is mounted. After the other end is processed in the same manner, the assembly of the combination unit of multiple membrane shells is finished.

When the membrane shell operates, successively, the raw water enters the raw water end of each of the membrane shells from the shared raw water port 2 through the adapter 6, and permeates a membrane element mounted inside the membrane shell 1 and is divided into clear water and concentrated water, in which the concentrated water collects from the other end (the concentrated water end) through the adapter 6 and is discharged from the shared concentrated water port 3. Due to the restriction of the binding tape 4 and the limitation of the snapping ring, the adapter 6 and the sealing ring 7 can only limitedly move within a sealed area inside the opening 15 of the membrane shell 1 close to the end portion such that the adapter 6 does not come off under pressure and the sealing between the adapter and the membrane shell is ensured.

Since each of the combination units of multiple membrane shells is connected with the pipeline by the shared raw water port 2 and the shared concentrated water port 3, the piping amount is small in engineering installation and maintenance, the number of the clamps to be used is reduced, the resource is saved and the cost is lowered. In addition, each of the combination units of multiple membrane shells has a relatively small occupied area and thus the space is more effectively used.

In the present embodiment, the raw water and the concentrated water interconnection passages are single runners, but the present invention is not limited thereto. For example, the raw water and the concentrated water interconnection passages may respectively be multiple-branch runners. By taking the present embodiment as an example, the interconnection passage may be selectively provided between the membrane shell located in the middle and each of the membrane shells or part of the membrane shells at its periphery, to reduce the pressure difference in the upper stream membrane shell and the down stream membrane shell. In addition, if it is necessary to provide the shared raw water port 2 and the shared concentrated water port 3 on the middle membrane shell, an end interfacing type membrane shell unit may be selectively used as the middle membrane shell.

The Fifth Embodiment

Figure 7:
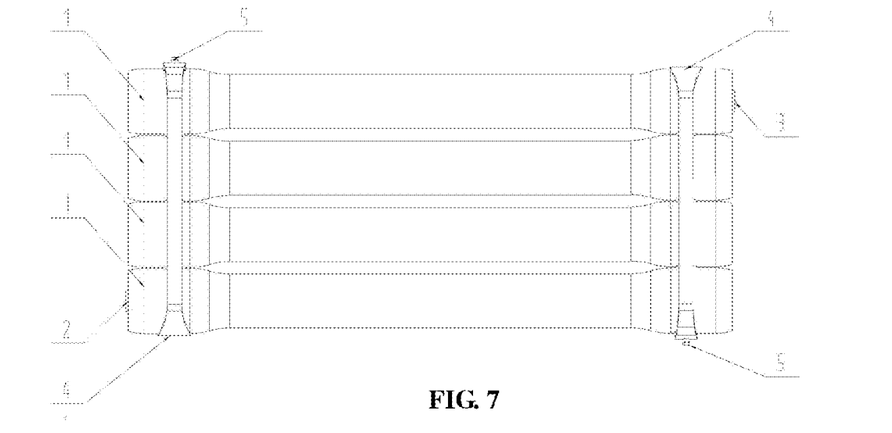
FIG. 7 is top schematic view of an end-inlet type and shared raw/concentrated water ports adopted in one embodiment of the present invention.
Figure 8:
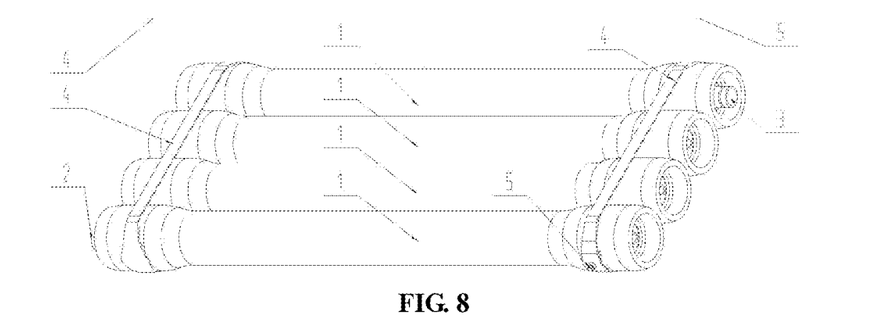
FIG. 8 is perspective schematic view of an end-inlet type shared raw and concentrated water ports adopted in the above embodiment of the present invention

FIG. 7 and FIG. 8 are the top view and the perspective schematic diagram of the end-inlet type shared raw and concentrated water ports adopted in one embodiment of the present invention.

In the present embodiment, the intercommunication and sealing of the raw water port 12 and the concentrated water port 13 between each of the membrane shells 1 may be realized in plural ways with reference to the aforementioned embodiments, with the main characteristic in the setting way of the shared raw water port 2 and the shared concentrated water port 3 of the combination unit of multiple membrane shells. In the aforementioned embodiment, the shared raw water port 2 or the shared concentrated water port 3 is realized by adopting a side-opening type membrane shell, whereas in the present embodiment, the shared raw water port 2 and the shared concentrated water port 3 are realized by the end interfacing type membrane shell. That is, different from the aforementioned embodiments in which the shared raw water port 2 and the shared concentrated water port 3 are arranged on the side wall, the shared raw water port 2 is arranged on an end portion blind at one end of the one membrane shell, and the shared concentrated water port 3 is arranged on an end portion blind at the other end of the other membrane shell. By this setting way, since the shared raw water port 2 and the shared concentrated water port 3 are arranged on the end portion blind, it is not necessary to provide a via hole, through which the shared raw water port 2 and the shared concentrated water port 3 extend, on the side wall corresponding to the binding tape 4, which can simplify the production and installation processes.

Similar to the aforementioned embodiments, in the present embodiment, the raw water interconnection passage is formed between the raw water ports 12 of multiple membrane shells 1, the concentrated water interconnection passage is formed between the concentrated water ports 13 of multiple membrane shells 1, the raw water interconnection passage and the concentrated water interconnection passage are respectively located in two planes vertical to the axial direction of the membrane shell, and the binding tape 4 is at least arranged correspondingly in the above two planes. The difference is in that: in the aforementioned embodiments, the shared raw water port 2 and the shared concentrated water port 3 are preferably located in two planes respectively, whereas in the present embodiment, since the shared raw water port 2 and the shared concentrated water port 3 are arranged on the end portion blind of the membrane shell, the shared raw water port 2 and the shared concentrated water port 3 are not located in the aforementioned two planes.

Figure 10:
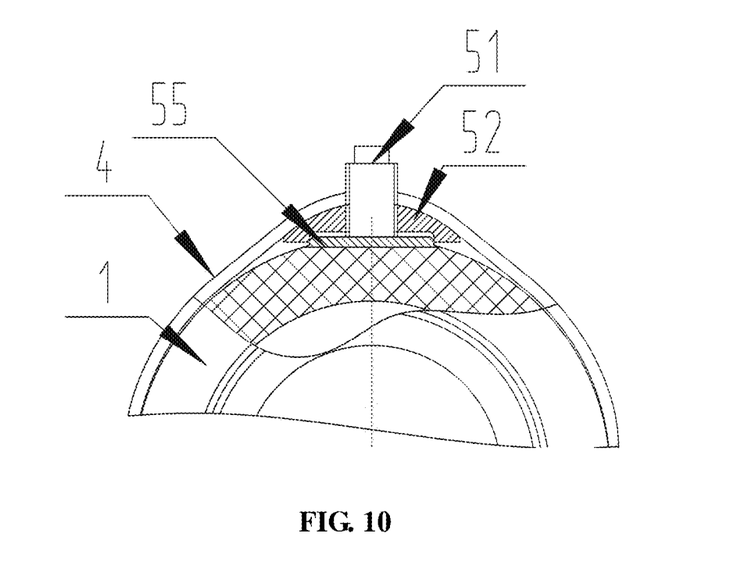
FIG. 10 is a structure schematic diagram of a manual pressure adjusting mechanism adopted in one embodiment of the present invention.

In addition, the combination unit of multiple membrane shells in the present embodiment is preferably provided with the binding tape 4, and the pressure adjuster 5 is provided between the binding tape 4 and the side wall of the membrane shell. With reference to FIG. 10, the pressure adjuster 5 may adopt the automatic pressure adjusting mechanism in the first embodiment or the manual pressure adjusting mechanism. The part in FIG. 10 which is the same as that in FIG. 9 regarding the automatic pressure adjusting mechanism is not stated again. The main difference is that: if the manual adjusting structure is adopted, the pressure adjuster does not need the piston 53 which may be replaced with the cushion block 55. In this way, the place corresponding to the side wall of the membrane shell does not necessarily have an opening. If the manual pressure adjusting mechanism is adopted, the pressure adjustment is realized in a way of manual tensioning when used.

From the aforementioned explanation, persons skilled in the art may understand that with reference to the aforementioned embodiments, the specific setting ways of other parts of the present embodiment can be obtained by combination one or more features selected in the aforementioned embodiments, and thus not repeated.

Except for the advantages of the first embodiment, the present embodiment also has the advantages that the side wall of the membrane shell does not need to be correspondingly punched, and thus the side wall of each of the membrane shells needs to be provided only with the raw water port 12 and the concentrated water port 13 for intercommunication, thereby further simplifying the production and installation processes and lowering the cost since the shared raw water port 2 and the shared concentrated water port 3 are respectively arranged on the end portion blinds at the two ends, and the manual pressure adjusting mechanism as shown in FIG. 10 is adopted.

In the present invention, the technical method of bundling multiple membrane shells in parallel is adopted to form the combination unit of multiple membrane shells, the raw water port and the concentrated water port of each of the membrane shells are respectively connected and sealed with the raw water port and the concentrated water port of one or more adjacent membrane shells by a adapter to form the shared raw water port and the shared concentrated water port. Each of the combination units of multiple membrane shells can be provided with a relatively small number of (for example, only one) shared raw water ports and shared concentrated water ports assembled with the pipeline. During operation, each of the combination units of multiple membrane shells makes water flow in by the shared raw water port, and the raw water distributes into each of the membrane shells after entering each of the combination units of multiple membrane shells since the raw water ports of multiple membrane shells are intercommunicated. Multiple membrane shells is bundled in parallel, and then is bound together by using the binding tape, the raw water port and the concentrated water port of each of the membrane shells are respectively connected with the raw water port and the concentrated water port of the adjacent membrane shell through the adapter, and the sealing rubber ring is utilized to seal the adapter and the membrane shell. Under the operation pressure, the raw water permeates a membrane element and is divided into clear water and concentrated water. The concentrated water joins together and is discharged by the shared concentrated water port since the raw water ports of multiple membrane shells are connected by the adapter. In addition, with respect to the prior art where the stainless steel clamp is used to connect the membrane shell, the snapping ring and the adapter in the present invention may adopt other metal or non-metal materials. Therefore, by adopting the technology of the combination unit of multiple membrane shells of the present invention, a large number of clamps is saved, the engineering cost is reduced, the number of sealed points is decreased, the hidden seepage danger is lowered, and the engineering installation workload is lessened. Moreover, since there does not need any clamp between the adjacent membrane shells, but only the snapping ring is adopted to separate the adjacent membrane shells, the spacing between the adjacent membrane shells can be greatly reduced (for example, reduced to 5 mm from 50 mm), thereby saving the occupied area of the apparatus.

Although the present invention has been disclosed by specific embodiments, the specific embodiments are not used to limit the present invention. Persons skilled in the art may make appropriate changes and modifications without deviating the thought and scope of the present invention. For example, except being connected by the adapter, the raw water port and the concentrated water port of each of the membrane shell units can be connected by directly pressing and sealing the openings or can be in tight connection with each other by cementing openings; for the specific setting way of the internal connection type adapter, it is possible to set a counterbore in the inner wall corresponding to the opening of the membrane shell, in which one of the adapter is provided with a flange, to be combined with the counterbore and sealed by the sealing ring; the other end of the adapter can be connected with the inner wall of the other membrane shell in a way of threaded connection or snap spring connection; the number and the position relationship of the raw water port and the concentrated water port of each of the membrane shells as well as the position relationship and the number of the binding tape and the pressure adjuster may be set according to actual requirements and are not limited to the aforementioned embodiments; the changes belong to the scope covered by the present patent.

What is claimed is:

1. A combination unit of multiple membrane shells, formed by bundling a plurality of membrane shells in parallel, wherein a raw water port and a concentrated water port of each of the membrane shells are respectively interconnected with those of an adjacent membrane shell, the combination unit of multiple membrane shells being formed with at least one shared raw water port and at least one shared concentrated water port which are respectively capable of being connected with a raw water pipeline and a concentrated water pipeline, correspondingly connected two raw water ports or two concentrated water ports of two adjacent membrane shells are interconnected by one adapter without using a clamp, each adapter forming a connection between two raw water ports or two concentrated water ports and wherein there is provided a seal extending around each adapter and wherein the seal is compressed by two adjacent membrane shells so as to seal the connection formed by the adapter, the combination unit of multiple membrane shells further comprising a binding firmware which is arranged at a periphery of the plurality of membrane shells bundled in parallel for combining the plurality of membrane shells into an integrated unit; wherein the binding firmware comprises a rigid or flexible binding tape that extends around the membrane shells and a pressure adjuster operatively connected between one of the membrane shells and the binding tape for preloading the binding tape and automatically adjusting the tension of the binding tape by using the pressure inside the membrane shells; and wherein each pressure adjuster comprises a preloaded bolt, a preloaded cushion block and a piston, and wherein the preloaded bolt is operative to position the preloaded cushion block and adjust a gap between a respective binding tape and the membrane shell in order to preload the binding tape.

2. The combination unit of multiple membrane shells according to claim 1, wherein the adapter is an externally connected adapter, the two ends of which are respectively aligned with an outer wall of the membrane shell around openings of two adjacent membrane shells, and a plane seal is adopted between the adapter and the membrane shell.

3. The combination unit of multiple membrane shells according to claim 1, wherein the adapter is made of a nonmetal material.

4. The combination unit of multiple membrane shells according to claim 1, wherein a raw water interconnection passage is formed between the raw water ports of the plurality of membrane shells, and a concentrated water interconnection passage is formed between the concentrated water ports of the plurality of membrane shells, the raw water interconnection passage and the concentrated water interconnection passage being respectively located in two planes vertical to the axial direction, and the binding tape being at least arranged correspondingly in the two planes.

5. An integrated unit comprising:
an array of integrated and interconnected membrane shells extending in parallel and side-by-side relationship for receiving raw water and producing concentrated water and clean water;
a shared raw water port operatively associated with the membrane shells for directing raw water to the membrane shells;
a shared concentrated water port for receiving concentrated water from the membrane shells;
wherein at least two adjacent membrane shells of the array includes aligned raw water ports and aligned concentrated water ports where each of the raw water ports and each of the concentrated water ports include an opening formed in a sidewall of respective membrane shells;
wherein the raw water ports are disposed on a first end portion of the integrated unit and the concentrated water ports are disposed on a second end portion of the integrated unit;
a first adapter extending between and communicatively connected to the aligned raw water ports for transferring raw water therein between the adjacent membrane shells;
a second adapter extending between and communicatively connected to the aligned concentrated water ports for transferring concentrated water therein and between the adjacent membrane shells;
a seal associated with each of the first and second adapters for sealing connections made by the first and second adapters between the aligned raw water ports and the aligned concentrated water ports;
first and second binding tapes extending around the array of membrane shells for binding the membrane shells together and forming the integrated unit;
the first binding tape provided at a position corresponding with the raw water ports in the two adjacent membrane shells and tensioned to press adjacent membrane shells towards each other and to compress the seal disposed around the first adapter and adjacent the raw water ports to seal the connection made by the first adapter with the raw water ports;
the second binding tape provided at a position corresponding with the concentrated water ports and tensioned to press the two adjacent membrane shells towards each other and to compress the seal disposed around the second adapter and adjacent the concentrated water ports to seal the connection made by the second adapter within the concentrated water ports;
a pressure adjuster operatively connected between one membrane shell and each of the first and second binding tapes for preloading the binding tapes and automatically adjusting the tension of the binding tapes by using the pressure inside the membrane shells; and
wherein each pressure adjuster comprises a preloaded bolt, a preloaded cushion block and a piston, and wherein the preloaded bolt is operative to position the preloaded cushion block and adjust a gap between a respective binding tape and the membrane shell in order to preload the binding tape.

6. The integrated unit of claim 5 wherein the combined action of the pressure adjusters and the first and second binding tapes press the adapters and seals into the openings formed in the sidewall of the membrane shells.

7. The integrated unit of claim 5 wherein each seal includes a ring seal that extends around a respective adapter and which is compressed between the membrane shells to seal the respective connections made between the adapters and the raw water ports and concentrated water ports.

8. The combination unit of claim 1 wherein each adapter extends between two aligned raw water ports or two aligned concentrated water ports, and wherein the seal associated with each adapter is a ring seal that extends around the adapter, and wherein the binding firmware extends around the plurality of membrane shells and causes the adapters to be pressed towards the two aligned raw water ports or two aligned concentrated water ports and at the same time compresses the seals between the membrane shells to form a seal around the respective adapters.

9. The combination of multiple membrane shells according to claim 1 wherein the first and second binding tapes extend completely around the membrane shells such that the membrane shells are completely encircled by the first and second binding tapes.

10. The combination unit of multiple membrane shells according to claim 1 wherein the binding tape completely encircles the membrane shells.

* * * * *